(12) United States Patent
Rebello et al.

(10) Patent No.: US 12,339,815 B1
(45) Date of Patent: Jun. 24, 2025

(54) CUSTOM DATA INTEGRATION SERVICE

(71) Applicant: BLACKROCK FINANCE, INC., New York, NY (US)

(72) Inventors: Snowil Rebello, Mumbai (IN); Emily Schwartz, New York, NY (US); Gagandeep Gupta, New York, NY (US); Ankur Goyal, San Francisco, CA (US); Colin Cassidy, London (GB); Veerbhan Tahlani, Gurgaon (IN); Puja Nagpure, Mumbai (IN)

(73) Assignee: BlackRock Finance, Inc., New York, NY (US)

( * ) Notice: Subject to any disclaimer, the term of this patent is extended or adjusted under 35 U.S.C. 154(b) by 0 days.

(21) Appl. No.: 18/068,773

(22) Filed: Dec. 20, 2022

(51) Int. Cl.
*G06F 16/30* (2019.01)
*G06F 16/21* (2019.01)
*G06F 16/22* (2019.01)

(52) U.S. Cl.
CPC .......... *G06F 16/212* (2019.01); *G06F 16/221* (2019.01); *G06F 16/2291* (2019.01)

(58) Field of Classification Search
CPC ... G06F 16/212; G06F 16/221; G06F 16/2291
See application file for complete search history.

(56) References Cited

U.S. PATENT DOCUMENTS

| | | | | |
|---|---|---|---|---|
| 11,238,016 B1 * | 2/2022 | Srinivasan | ............ | G06F 16/212 |
| 2004/0225763 A1 * | 11/2004 | Carroll | ................. | G06F 3/0683 |
| | | | | 710/36 |
| 2010/0274813 A1 * | 10/2010 | Lu | .......... | G06F 16/252 |
| | | | | 707/792 |
| 2012/0173478 A1 * | 7/2012 | Jensen | ................. | G06F 16/283 |
| | | | | 707/602 |
| 2013/0066892 A1 * | 3/2013 | Mineno | ................... | G06F 30/00 |
| | | | | 707/E17.014 |
| 2014/0156591 A1 | 6/2014 | Sukumar et al. | | |
| 2018/0300402 A1 * | 10/2018 | Nassar | ................. | G06F 16/367 |
| 2019/0026386 A1 * | 1/2019 | McWaters | ............... | G06F 16/84 |
| 2020/0081899 A1 | 3/2020 | Shapur et al. | | |
| 2021/0081378 A1 | 12/2021 | Hu et al. | | |
| 2022/0114163 A1 | 4/2022 | Seetharaman et al. | | |
| 2022/0229821 A1 * | 7/2022 | Greenshpan | .......... | G06F 16/213 |

* cited by examiner

*Primary Examiner* — Khanh B Pham
(74) *Attorney, Agent, or Firm* — Haynes and Boone, LLP

(57) ABSTRACT

A system, method, and a computer program product for a data integration service are provided. The integration data service receives a custom dataset. The integration data service creates a dataset definition, a schema definition and an entity definition associated with the custom dataset. The dataset definition includes a dataset name. The schema definition defines access to a subset of attributes in the custom dataset. The entity definition defines an at least one entity and links the subset of attributes and the at least one entity. The dataset definition, the schema definition, and the entity definition are linked using the dataset name. The data from the custom dataset is retrieved by the integration data service by applying the dataset definition, the schema definition, and the entity definition to the custom dataset. The retrieved data is further integrated with the data from the platform.

20 Claims, 9 Drawing Sheets

300

↳ Dataset: ESG_ISSUER

Entities (6 Results)

| Entity Name | Corporate Governance Score | Weighted Average Score | ESG Rating - Company | Version | State | Start Time | Expire Time |
|---|---|---|---|---|---|---|---|
| | | | | | | mm/dd/yyyy | mm/dd/yyyy |
| CQW390 | 3.77 | 4.92 | Y | 1 | APPROVED | 16-Mar-2022 20:00... | 30-Dec-2222 19:00 |
| 8H8843 | 3.05 | 4.56 | Y | 1 | APPROVED | 16-Mar-2022 20:00... | 30-Dec-2222 19:00 |
| 8W7535 | 3.05 | 4.90 | N | 1 | APPROVED | 16-Mar-2022 20:00... | 30-Dec-2222 19:00 |
| 0R8097 | 3.11 | 4.21 | N | 1 | APPROVED | 16-Mar-2022 20:00... | 30-Dec-2222 19:00 |
| 81J5842 | 3.21 | 4.35 | Y | 1 | APPROVED | 16-Mar-2022 20:00... | 30-Dec-2222 19:00 |
| 28J6621 | 3.21 | 4.37 | Y | 1 | APPROVED | 16-Mar-2022 20:00... | 30-Dec-2222 19:00 |

Custom Attributes 306

Entities 304

402
┌─────────────────────────────────────────────────────────────────────┐
│  "author": "testvId",                                               │
│  "datasetFullName": "ESG Issuer Dataset Example",                   │
│  "datasetName": ┌"ESG_ISSUER"┐,                            ← 408    │
│  "datasetType": "DATASET_TYPE_SCHEMA",                              │
│  "description": "TEST DATASET FOR GUIDE",                           │
│  "elementPath": "PM_ENGG_ESG_V2.ESG_Cl1.ESG_GR1.┌ESG_ISSUER┐",  ← 410│
│  "id": "",                                                          │
│  "metaInfo": "Key Dataset Contact: XXXXXXX",                        │
│  "purpose": "PURPOSE_DATASET",                                      │
│  "state": "STATE_APPROVED"                                          │
└─────────────────────────────────────────────────────────────────────┘
  ▲                ▲                                        ▲
  404              406                                      412
```

FIG. 4

CUSTOM DATA INTEGRATION SERVICE

TECHNICAL FIELD

The embodiments are directed to data services, and more specifically to data services that integrate custom data into a platform.

BACKGROUND

Data platforms typically upload data from various data sources. The data is processed and made available to users over a user interface. The data sources are typically connected to the platform and cause the platform to receive data. In some instances, users may also have data that is external to the platform. This data may be custom data and is typically in a user-specific format. Accordingly, there is a need to upload the user-specific data to the platform and integrate the uploaded data with the data from various data sources.

BRIEF DESCRIPTION OF THE DRAWINGS

FIG. 3 is an example diagram of a custom dataset displayed in a user interface, according to some embodiments.

FIG. 4 is an example diagram of a dataset definition, according to some embodiments.

In the figures, elements having the same designations have the same or similar functions.

DETAILED DESCRIPTION

The embodiments are directed to a custom data integration interface. The custom data integration service may receive a custom dataset, filter the data in the custom dataset according to predefined attributes, and integrate the filtered data with other data available on a platform. The custom data integration service may include an application programming interface (API) that may receive instructions that create dataset definitions, schema definitions, and entity definitions. The custom data integration service may also access the dataset definitions, the schema definitions, and the entity definitions, extract data from the custom dataset according to the definitions, and display the data. In this way, the custom data integration service provides a flexible API for filtering custom data and displaying the extracted data. In some instances, the custom data integration service may also integrate the data from the custom dataset with data from other data sources and/or platforms. The custom data integration service may then display the integrated data.

The details of the embodiments are further discussed below.

Figure 1:
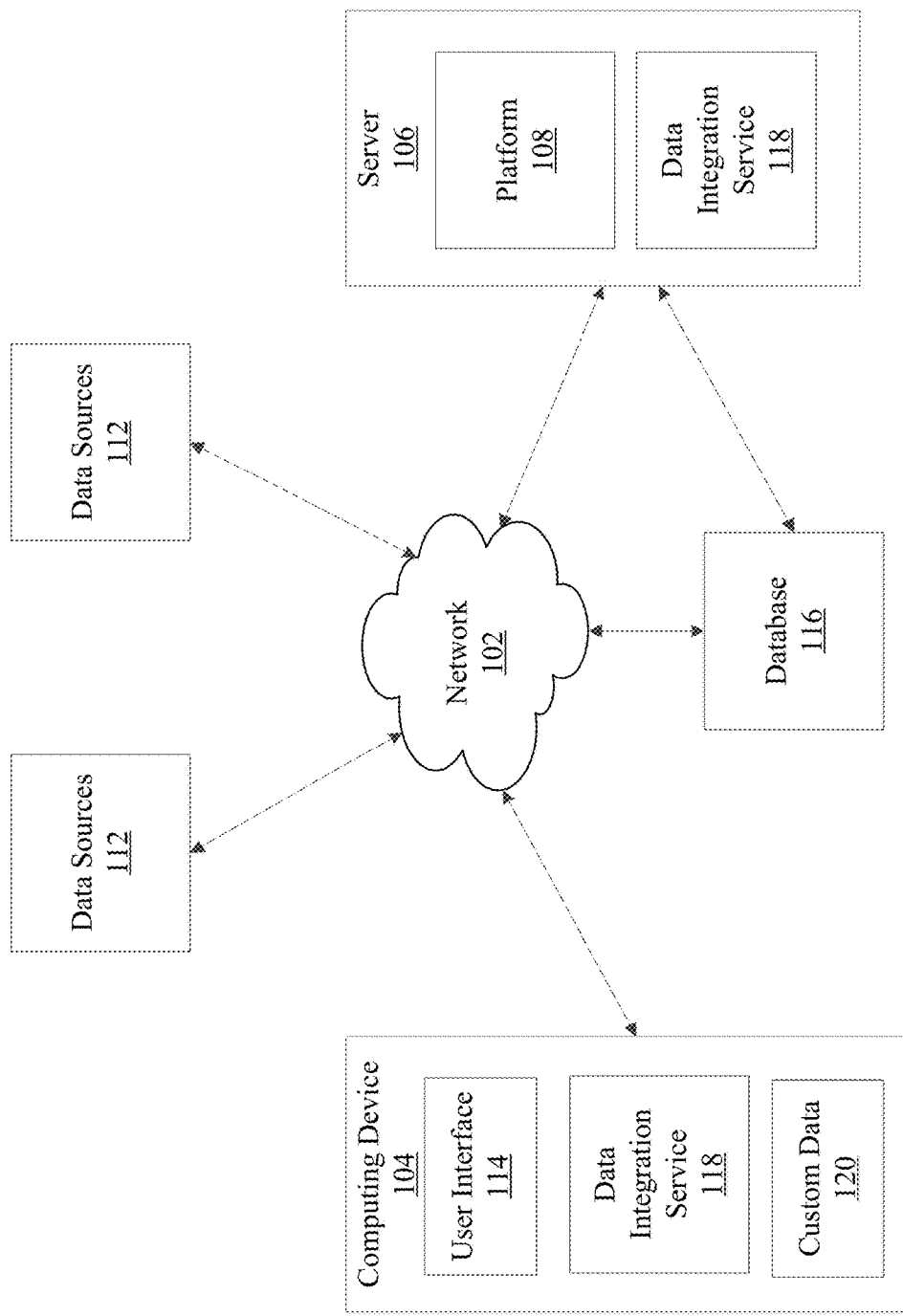
FIG. 1 is a simplified diagram of a system where the embodiments may be implemented.

FIG. 1 is an exemplary system 100 where embodiments can be implemented. System 100 includes a network 102. Network 102 may be implemented as a single network or a combination of multiple networks. For example, in various embodiments, network 102 may include the Internet or one or more intranets, landline networks, wireless networks, and/or other appropriate types of networks. Network 102 may be a small-scale communication network, such as a private or local area network, or a larger scale network, such as a wide area network. Network 102 may be accessible by various components of system 100.

System 100 also includes one or more computing devices 104 and servers 106, although only one of each is shown. Computing devices 104 may be portable and non-portable electronic devices under control of a user. Computing devices 104 may be configured to transmit, receive, and manipulate data, execute various applications, and communicate with other devices connected to network 102. Example computing devices 104 may be desktop computers, laptop computers, tablets, smartphones, wearable computing devices, eyeglasses that incorporate computing devices, implantable computing devices, etc.

In some embodiments, network 102 may also include servers 106. Servers 106 may be computer software programs or hardware devices that allow computing devices 104 to access centralized applications, platforms, provide processing capabilities and facilitate distribution of data throughout network 102.

Server 106 may execute a platform 108 or another application. Although illustrated as a single server 106 and platform 108, system 100 may include multiple servers 106 and platforms 108. Platform 108 may be any type of software (or a combination of software and hardware) that receives data from data sources 112. Platform 108 may process, analyze, and display the data via a user interface, application programming interface and the like (collectively referred to as a user interface 114) of computing device 104. In some instances, platform 108 may be a portfolio management software that receives trade and securities data from data sources 112, analyzes the trade and security data and provides portfolio recommendations, security, bonds, ETF (exchange traded funds) recommendations, ESG (Environment, Social, Governance) recommendations, and the like. In some instances, data from data sources 112 may be data that is publicly available over network 102 to various platforms 108.

Typically, the data from data sources 112 may be stored within database 116. Database 116 may be a memory storage conducive for storing and retrieving large amount of data. Database 116 may also be communicatively connected to server 106 via network 102 or via another data connection. Notably, the embodiments in system 100 are not limited to database 116 and may be applicable to another memory storage conducive to storing and retrieving large amounts of data.

Computing devices 104 and servers 106 may store and execute a data integration service 118. Data integration service 118 may be implemented in software and/or hardware that has sequential and parallel processing capabilities. Data integration service 118 may read custom dataset 120. Custom dataset 120 may be data that is associated, generated, and/or updated by a user or another system that is not associated with data sources 112 or platform 108. Typically, custom dataset 120 may be uploaded to computing device 104 or be created on computing device 104. Data integration service 118 may create dataset definitions, schema definitions, and entity definitions for custom dataset 120. Once created, the dataset definitions, schemas definitions, entity definitions, and custom dataset 120 may be stored within computing device 104 or be transmitted through network 102 or another data connection for storage in database 116.

Data integration service 118 may also retrieve the dataset definitions, schema definitions, and entity definitions from database 116, access the custom dataset 120 using the dataset definitions, and retrieve data from the custom dataset 120 based on the schema definitions and the entity definitions. The data from the custom dataset 120 may be data that is filtered according to criteria specified in the schema and entity definitions. An example criteria may be a particular set of attributes associated with certain entities. In some embodiments, platform 108 may receive the data retrieved from the custom dataset 120, analyze or model the data, and integrate the data with other data available to the platform (e.g., data from data sources 112). Data integration service 118 may also display the data retrieved from custom dataset 120 or the data integrated, analyzed or modeled by platform 108 on the user interface 114.

As discussed above, computing device 104 may include user interface 114. User interface 114 may display data from platform 108, custom dataset 120, a subset of custom dataset 120, and/or data from platform 108 that is integrated with the data from the custom dataset 120. Additionally, user interface 114 may receive instructions that generate dataset definitions, schema definitions, and entity definitions. These definitions define how data in custom dataset 120 is selected, formatted, displayed and/or combined with the data from platform 108. User interface 114 may be communicatively connected to data integration service 118, platform 108, Internet, or another application that facilitates transmission and display or data in an application or a web formats.

In some embodiments, data integration service 118 may execute on one or more computing devices 104 or servers 106. In other embodiments, data integration service 118 may execute in part on one or more computing devices 104 and in part on one or more servers 106. Data integration service 118 with different components or modules executing on computing device 104 and server 106 may include a communication interface for receiving and transmitting data between the components or modules of data integration service 118.

Figure 2:
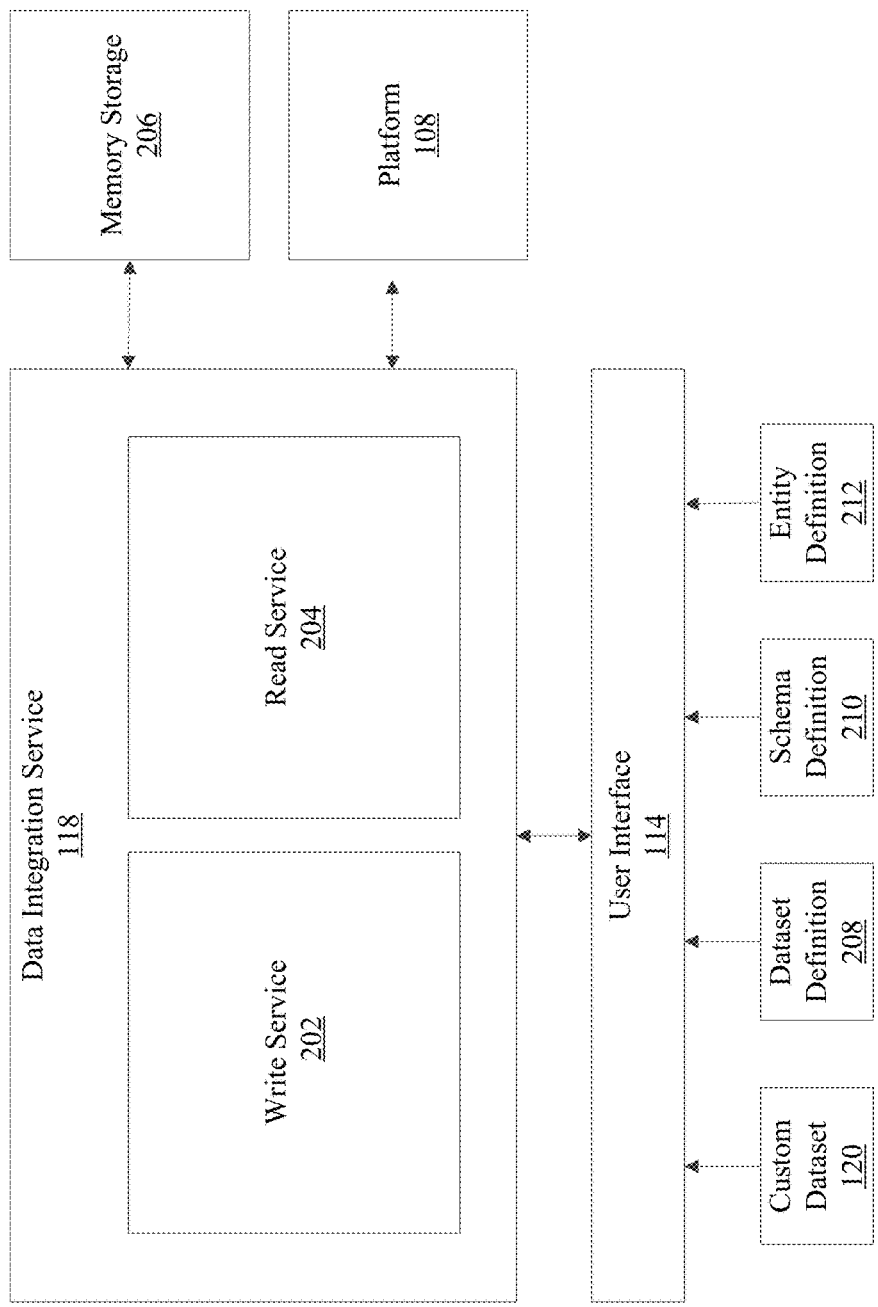
FIG. 2 is an example diagram of a custom data integration service, according to some embodiments.

FIG. 2 is a block diagram 200 of a data integration service, according to some embodiments. Data integration service 118 includes a write service 202 and a read service 204. Both write service 202 and read service 204 are communicatively connected to user interface 114. Data integration service 118 may also be connected to memory storage 206 and platform 108.

Write service 202 may receive instructions through user interface 114 to generate custom dataset 120 or upload custom dataset 120 to memory storage 206. Write service 202 may also receive instructions through user interface 114 to create, update, expire, and activate dataset definitions 208 for custom dataset 120. Write service 202 may receive instructions to create, update, and expire schema definitions 210 that create and update dataset schemas. Additionally, write service 202 may receive instructions to create, update, and expire entity definitions 212 that create or update dataset entities. Like custom dataset 120, dataset definitions 208, schema definitions 210 and entity definitions 212 may be stored within a memory storage 216, which may be database 116 or a memory storage of computing device 104 discussed in FIG. 1.

As discussed above, custom dataset 120 may include custom data that is not included in platform 108 or generated by data sources 112. Custom dataset 120 may be a user-provided or a user-generated dataset that may be included in various analytics and/or models included in platform 108. In some embodiments, custom dataset 120 may be viewed as a container that includes data associated with entities and attributes, and associates entities with particular sets of attributes.

In some embodiments, dataset definition 208 may be a structure that defines access to the custom dataset 120. Dataset definition 208 may include parameters, such as a name of custom dataset 120, an author of the custom dataset 120, a dataset description, a dataset identifier (if any), and a location of the dataset within memory storage 206.

In some embodiments, schema definition 210 for custom dataset 120 may define a schema. A schema is a mechanism or instructions in a software language by which attributes in custom dataset 120 may be retrieved from custom dataset 120, displayed on user interface 114, or analyzed by platform 108. These attributes may be a subset of attributes that are included in custom dataset 120. Schema definition 210 may also include a dataset name that may be used to access custom dataset 120 and link the schema definition 210 with dataset definition 208.

In some embodiments, entity definition 212 may define one or more entities. An entity may be a key identifier, such as an entity name, a cusip or issuer identifier within custom dataset 120. A set of attributes may be tagged to a particular entity. An entity may also be associated with other attributes, such as attributes generated by data sources 112. These associations may be included in entity definition 212. Entity definition 212 may also include a dataset name, such as a name of custom dataset 120, that links the entities in entity definition 212 to dataset definition 208 and schema definition 210.

Notably, although the examples herein illustrate a single custom dataset 120, dataset definition 208, schema definition 210, and entity definition 212, the embodiments may also apply to multiple dataset definitions, schema definitions, and entity definitions for different custom datasets.

Read service 204 may receive instructions through user interface 114 to display custom dataset 120, display a subset of data from custom dataset 120, integrate data in the custom dataset 120 with the data from platform 108, and/or retrieve custom dataset 120 for analysis by platform 108. Read service 204 may retrieve custom dataset 120 using the dataset definition 208, schema definition 210, and entity definition 212. In particular, read service 204 may retrieve the dataset definition 208 by dataset name, schema definition 210 by a schema name and/or dataset name, and entity definition 212 by dataset name from memory storage 216. Once the read service 204 retrieves definitions 208-212, read service 204 may retrieve the data from custom dataset 120 as specified in definitions 208-212. In particular, read service 204 may filter entities in custom dataset 120 by criteria, e.g., entity name and/or entity type as specified in the entity definition 212 and attributes as specified in the schema definition 210. Once the data is retrieved, integrated, and/or analyzed by read service 204 and/or platform 108, read service 204 may display the data using user interface 114.

FIG. 3 is a block diagram 300 of a custom dataset displayed in a user interface, according to some embodiments. As illustrated in FIG. 3, user interface 114 displays data 302. Data 302 may be retrieved, in part, from custom dataset 120 called "ESG_ISSUER." Data 302 includes entities 304 that are identified by an entity name and attributes 306 associated with entities 304. Attributes 306 may be custom attributes 306 from custom dataset 120. In some instances, along with custom attributes 306, user interface may also display other attributes 308. Other attributes 308 may be attributes associated with entities 304 that were received from data sources 112 or platform 108. The user interface 114 may have received data 302 from read service 204 discussed in FIG. 2. The read service 204 may have uploaded custom attributes 306 from custom dataset 120 as specified by the dataset definition 208, schema definition 210, and entity definition 212 discussed in FIG. 2.

As illustrated in FIG. 3, user interface 114 may display data 302 in a table 310. User interface 114 may display entities 304 that are included in entity definition 212, which is a subset of entities that are available in custom dataset 120. User interface 114 may also display custom attributes 306 that are included in entity definition 212 and schema definition 210, which is a subset of attributes available in custom dataset 120. In this way, the schema definition 210 and entity definition 212 provide for filtering of entities in attributes in custom dataset 120 as specified in definitions 210-212.

In some embodiments, user interface 114 may adjust the number of rows that include entities 304. The adjustment may be based on a size of the display screen, a predefined number of entities 304, or some other criteria. In some instances, user interface 114 may display the predefined number of entities 304 and use a scroll function (not shown) that receives user input to scroll and display the entities that are not initially displayed by user interface 114.

FIG. 4 is a diagram 400 of a dataset definition, according to some embodiments. A dataset definition 402 may be dataset definition 208 discussed in FIG. 2. Dataset definition 402 may identify information associated with a custom dataset, such as custom dataset 120 discussed above. Dataset definition 402 may be configured using write service 202 discussed in FIG. 2 and stored in memory storage 216. In some instances, dataset definition 402 may be configured using user interface 114 that receives values for the parameters to be included in dataset definition 402. For example, dataset definition 402 may include values in a token-value format, where each parameter corresponds to a token. The user interface 114 may provide a display with text boxes or another data input interface that may receive values for the corresponding tokens that are to be included in the dataset definition 402.

The information included in dataset definition 402 may include parameters, such as a dataset name, an author of the dataset, a type of data that is being uploaded to data integration service 118, a description of the data, a location of the dataset, a dataset id, metadata information of the dataset, a purpose of the dataset, and a state of the dataset. The parameters in dataset definition 402 may be mandatory parameters or optional parameters. The optional parameters may not include values or may include null values.

In some embodiments, a dataset name parameter 404 may include a name of the custom dataset 120. The name of the dataset may link dataset definition 402 to one or more schema definitions 208 and one or more entity definitions 212 that are associated with custom dataset 120 and that are further discussed below.

In some embodiments, the dataset name parameter 404, shown as "datasetName," may store the name of the dataset and the path parameter 406, shown as "elementPath," may store the location of the custom dataset 120 in memory storage 216 or another memory. In some instances, the name of the dataset may match the last element in the path of the dataset. For example, the name 408 of the custom dataset, e.g., "ESG_ISSUER," in the dataset name parameter 404 may match to the name 410 of the last element in the path parameter 406.

In some embodiments, dataset definition 402 may include a state parameter 412. State parameter 412 may indicate whether the custom dataset 120 included in dataset definition 402 has been approved for integration and analysis with platform 108.

In FIG. 4, the dataset definition 402 is shown in a JavaScript Object Notation (JSON) format, though the implementation is not limited to this embodiment and other formats and software languages for defining a dataset may also be used.

Figure 5:
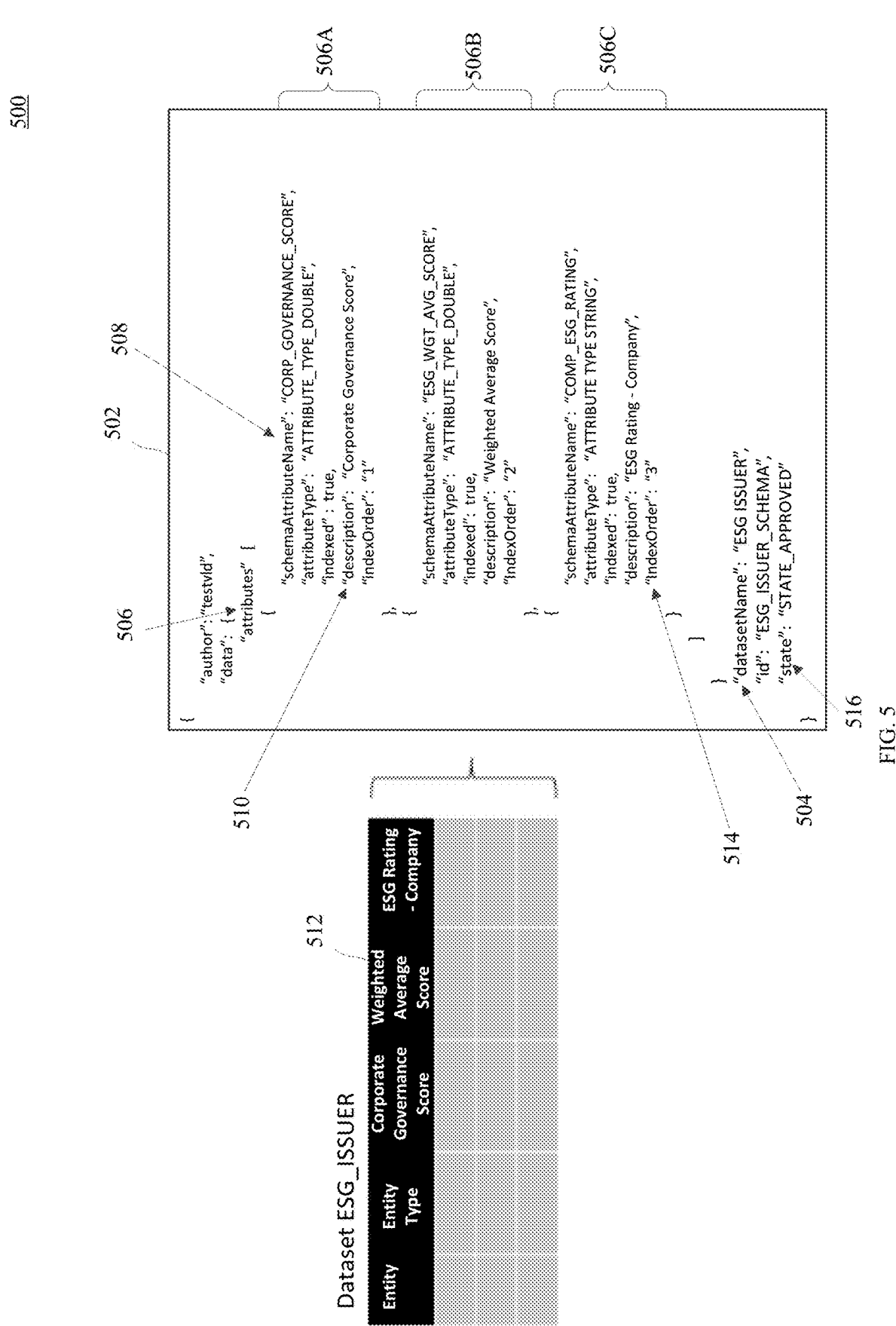
FIG. 5 is an example diagram of a schema definition, according to some embodiments.

FIG. 5 is a diagram 500 of a schema definition, according to some embodiments. Schema definition 502 may be schema definition 210 discussed in FIG. 2. Schema definition 502 defines the custom attributes 506 in custom dataset 120. Schema definition 502 may be configured using write service 202 discussed in FIG. 2 and stored in memory storage 216. In some instances, schema definition 502 may be configured using user interface 114 that receives values for the parameters to be included in schema definition 502. For example, schema definition 502 may include values in a token-value format, where each parameter corresponds to a token. The user interface 114 may provide a display with text boxes or another data input interface that may receive the values for the corresponding tokens that are to be included in the schema definition 502.

As discussed above, the custom dataset 120 may have a dataset name that is "ESG_ISSUER." The name of the custom dataset 120 may be included in the dataset name parameter 504. In addition, schema definition 502 may include an attributes parameter 506 that may list one or more custom attributes associated with custom dataset 120. In FIG. 5 there may be three custom attributes 506A-C. Each custom attribute 506A-C in custom attributes 506 may include one or more attribute parameters. Example attribute parameters may be an attribute name, an attribute data type (e.g., string, Boolean, integer, double, long, datetime, or Enum), a description or title of the attribute, whether the attribute is or is not indexed, and an index order. The attribute name may be set using the attribute name parameter 508 and may correspond to the name of the attribute in the schema and in the entity definition, discussed below. The description of the attribute may be set in the description parameter 510 and may describe the title of the attribute as displayed in a table 512. The index order may be set using the index order parameter 514 and may indicate an order of the attributes 506A-C in table 512.

For example, as illustrated in FIG. 5, custom attribute 506A has an attribute name "CORP_GOVERNANCE_SCORE," has a type double, has an index set to "true," has a description "Corporate Governance Score," and has an index order of "1." As illustrated in table 512, custom attribute 506A is the first custom attribute in table 512 with respect to other custom attributes 506B-C. This is because the index order is set to "1". Further, the column that includes the data for the custom attribute 506A has a description "Corporate Governance Score" that corresponds to the description parameter 510 associated with custom attribute 506A.

The read service 204 may use the schema definition 502 to generate table 512. Table 512 may be displayed using user interface 114. Because the schema definition 502 defines the schema and custom attributes from the custom dataset 120, but does not include the data itself, schema definition does not populate table 512 with the data. Instead, schema definition 502 may define the headings of the columns in table 512 that include custom attributes 506 using the description parameter 510. Accordingly, table 512 remains empty until read service 204 populates table 512 with values from or associated with custom dataset 120 as specified by the entity definition 212 discussed in FIG. 6.

In some instances, schema definition 502 may include a state parameter 516. State parameter 516 may indicate permissions associated with schema definition 502. For example, state parameter 516 may indicate whether the schema was approved to define custom attributes in custom dataset 120.

In FIG. 5, the schema definition 502 is shown in a JSON format, though the implementation is not limited to this embodiment and other formats and software languages for defining a dataset may also be used.

Figure 6:
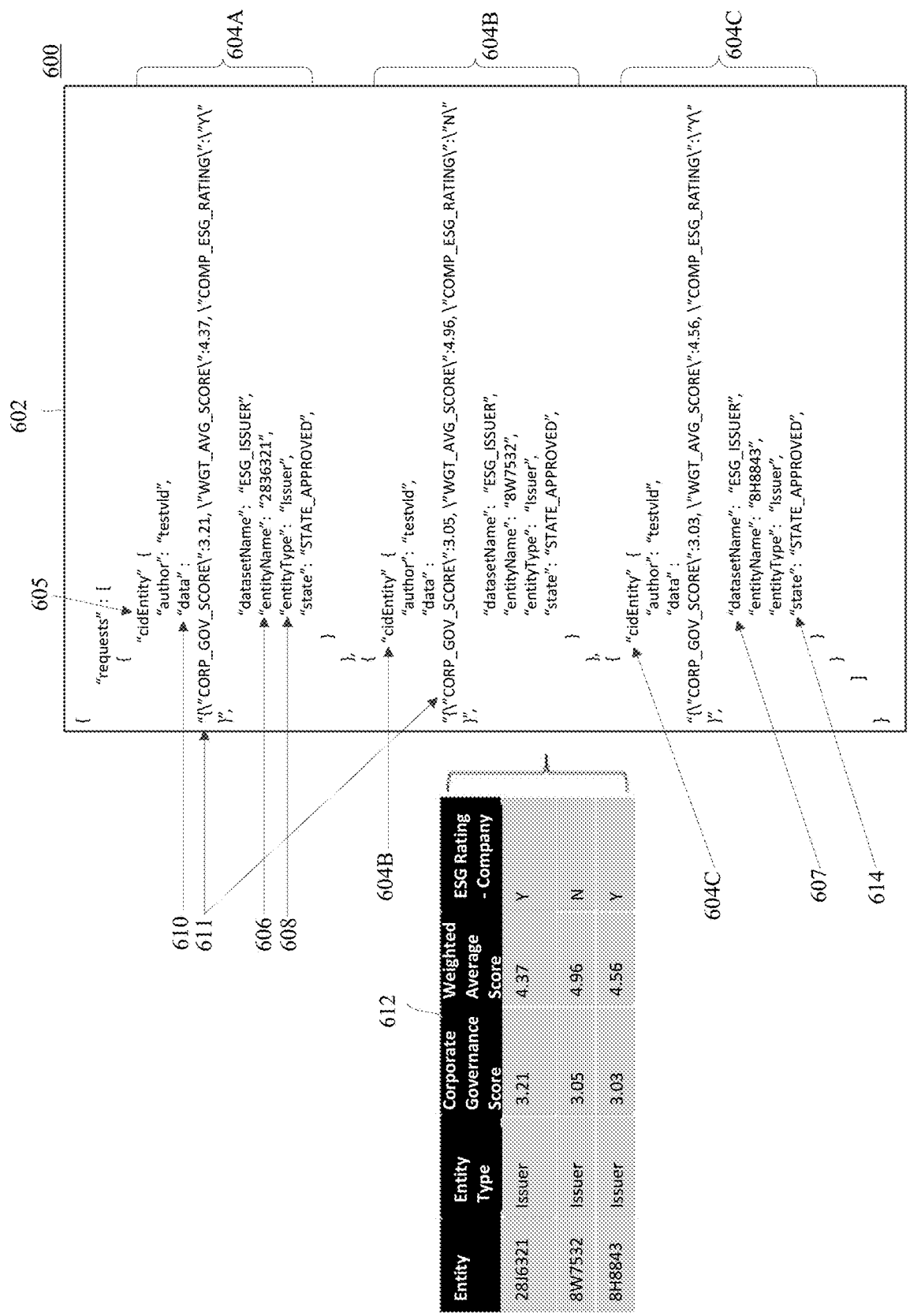
FIG. 6 is an example diagram of an entity definition, according to some embodiments.

FIG. 6 is a diagram 600 of an entity definition associated with a custom dataset, according to some embodiments. FIG. 6 illustrates an entity definition 602, which may be entity definition 212 discussed in FIG. 2. The entity definition 602 defines entities 604 and links entities 604 with custom dataset 120. Additionally, entity definition 602 may link entities 604 with data associated with platform 108 (not shown).

Entity definition 602 may be configured using write service 202 discussed in FIG. 2 and stored in memory storage 216. In some instances, entity definition 602 may be configured using user interface 114 that receives values for the parameters to be included in entity definition 602. For example, entity definition 602 may include values in a token-value format, where each parameter corresponds to a token. The user interface 114 may provide a display with text boxes or another data input interface that may receive the values for the corresponding tokens that are to be included in the entity definition 602.

In some embodiments, entity definition 602 may define one or more entities 604. FIG. 6, for example, include three entities 604A-C. Entities 604A-C may be defined using an entity identifier parameter 605, such as "cidEntity."

Each entity 604A-C may be associated with one or more parameters. For example, entities 604A-C may have an entity name and/or entity type. Each entity 604A-C may be associated with an entity name using the entity name parameter 606 and/or entity type using entity type parameter 608. There may be one entity name parameter 606 and one entity type parameter 608 for each entity 604A-C. For example, entity name for entity 604A may be set using entity name parameter 606 to "28J6321" and entity type for entity 604A may be set using entity type parameter 608 to "Issuer." The entity name and entity type may be displayed as columns in a table 612 that may display custom dataset 120 in user interface 114.

Entities 604 may include a dataset name parameter 607. The dataset name parameter 607 may correspond to the custom dataset 120 from which the read service 204 may retrieve data. As illustrated in FIG. 6, the custom database may be "ESG_ISSUER" discussed in FIGS. 4 and 5. Although not illustrated, different entities may correspond to different custom datasets, where each dataset may be designated using dataset name parameter 607. In this way, different custom datasets may be integrated and displayed within the same table 612.

Entities 604 may include a data parameter 610. Data parameter 610 may set data 611 included in custom dataset 120 and identified using attributes 506 in schema definition 502 discussed in FIG. 5. Data parameter 610 may be associated with a corresponding entity. For example, for entity 604A corresponding to "entityName". 28J6321, the corresponding data 611 may be: "{\"CORP_GOV_SCORE\":3.21,\"WGT_AVG_SCORE\":4.37,\"COMP_ESG_RATING\":\"Y\"}"

As discussed with respect to FIG. 5, read service 204 may use schema definition 502 to generate table 512 that includes information associated with custom attributes 506. Read service 204 may use entity definition 602 to populate table 512 with data from custom dataset 120, that is shown in FIG. 6 as table 612. As illustrated in FIG. 6, table 612 includes data 611 associated with custom attributes of entities 604A-C and parameters associated with entities 604A-C. For example, table 612 displays entity name generated from entity name parameter 606, entity type generated from entity type parameter 608, and data associated with custom attributes generated from data 611. Table 612 may also display the column headings for the entity and the entity type which may be configured using entity definition 602 (not shown). The table 612 may be displayed using user interface 114.

In some instances, each entity 604A-C may further include a state parameter 614. State parameter 614 may indicate permissions associated with entities 604A-C. For example, state parameter 614 may indicate whether data 602 has been approved to be displayed using user interface 114, be included in platform analytics provided by platform 108, or be integrated with the data associated with platform 108.

Figure 7:
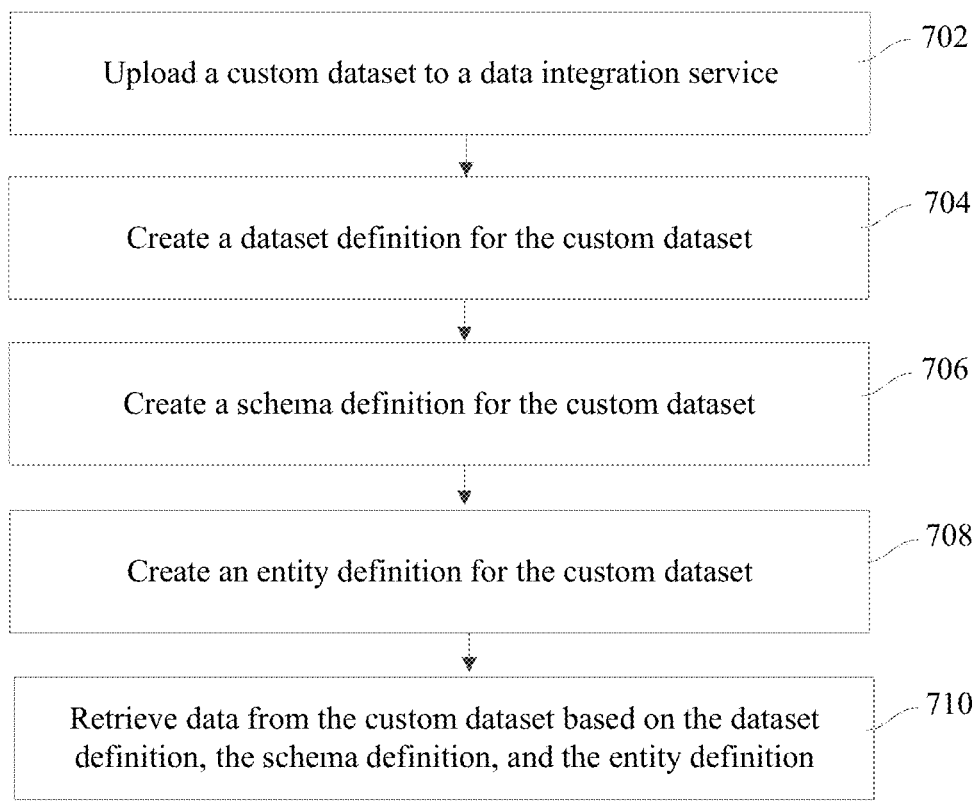
FIG. 7 is a diagram of a method for configuring dataset, schema, and entity definitions, according to some embodiments.

FIG. 7 is a simplified diagram of a method 700 for generating a dataset, according to some embodiments. One or more of the processes 702-710 of method 700 may be implemented, at least in part, in the form of executable code stored on a non-transitory, tangible, machine-readable media that when run by one or more processors may cause the one or more processors to perform one or more of the processes 702-710.

At process 702, a custom dataset is uploaded to the data integration service. For example, custom dataset 120 may be provided to data integration service 118 for an upload and storage in memory storage 206. In some embodiments, custom dataset 120 may be verified and approved as being compatible with data in platform 108 or to be processed and/or analyzed by platform 108.

At process 704, a dataset definition is created. For example, a write service 202 may receive instructions that create a dataset definition 208 for custom dataset 120. An example dataset definition 208 may include a name of an author of custom dataset 120, a dataset name, a description of the dataset, a path to a location of the dataset in memory storage 206, and other information described in more detail in FIG. 4.

At process 706, a schema definition is created. For example, write service 202 may receive instructions that create schema definition 210 for custom dataset 120. The schema definition 210 may include attributes 506 from custom dataset 120 that may be extracted and displayed on user interface 114 or be analyzed by platform 108. For each attribute in attributes 506, schema definition 210 may include an attribute name in the attribute name parameter 508, an attribute description in the description parameter 510, and an index order specifying the location of the attribute with respect to other attributes 506 in table 512 in the index order parameter 514.

At operation 708, an entity definition is created. For example, write service 202 may receive instructions that create entity definition 212 for custom dataset 120. The entity definition 212 may include one or more entities 604. Each entity in entities 604 may include an entity name parameter 606 that includes the entity name, the entity type parameter 608 that includes the entity type, the dataset name parameter 607 that includes the name of custom dataset 120, and data parameter 610 that includes the data 611 from custom dataset 120 as defined in schema definition 502.

At operation 710, data is retrieved from the custom dataset. For example, read service 204 may use dataset definition 208, schema definition 210, and entity definition 212 to retrieve data from custom dataset 120. Moreover, read service 204 may transmit the data to be analyzed by platform 108 and displayed in a table as shown in FIG. 3.

Figure 8:
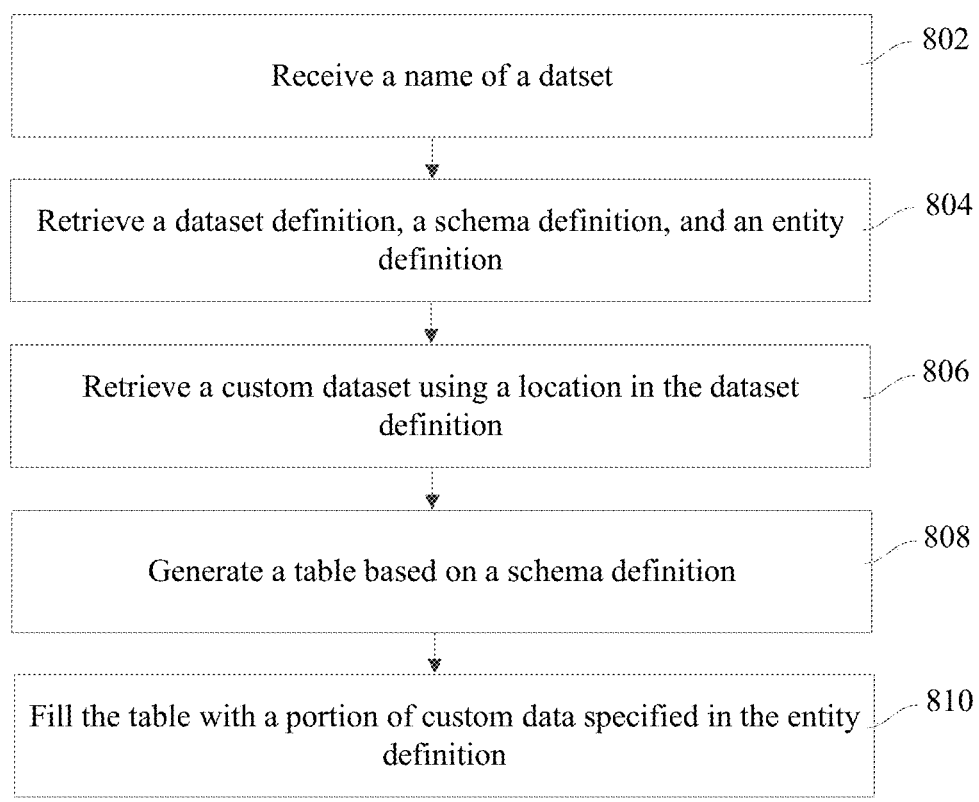
FIG. 8 is a diagram of a method for integrating and displaying a dataset, according to some embodiments.

FIG. 8 is a simplified diagram of a method 800 for integrating and displaying a dataset, according to some embodiments. One or more of the processes 802-810 of method 800 may be implemented, at least in part, in the form of executable code stored on a non-transitory, tangible, machine-readable media that when run by one or more processors may cause the one or more processors to perform one or more of the processes 802-810.

At process 802, a name of a dataset is received. For example, read service 204 may receive a name of custom dataset 120 via user interface 114.

At process 804, definitions are retrieved. For example, read service 204 may use a dataset name to retrieve dataset definition 402, schema definition 502, and entity definition 602 that correspond to the name of the dataset.

At process 806, a custom dataset is retrieved. For example, read service 204 may retrieve custom dataset 120 from a location, e.g., the path parameter 406, specified in dataset definition 402.

At process 808, a table is generated based on the schema definition. For example, read service 204 may use schema definition 502 to generate table 512 that includes names for the custom attributes 506 from custom dataset 120 that are specified in schema definition 502. Read service 204 may also include the column headings for the custom attributes 506 in table 512 as specified in the description parameter 510.

At process 810, a table is filled with custom data. For example, read service 204 may use entity definition 602 to retrieve attribute data from custom dataset 120 that is specified in entity definition 602 and populate the table 612 with attribute data as specified in schema definition 502. In some instances, read service 204 may pass the data to platform 108. Platform 108 may receive and integrate the data from custom dataset 120 with the data associated with entities 604 that is included in platform 108. Platform 108 may also analyze and model the data retrieved from custom dataset 120 and/or make data predictions based on the analysis. Read service 204 may then populate the table 612 with the data retrieved from custom dataset 120, the data integrated with the data from platform 108, or the data retrieved from custom data and analyzed by platform 108. In this way, read service 202 may filter data in custom dataset 120 and display a subset of data from custom dataset 120 based on the attributes and entities.

Figure 9:
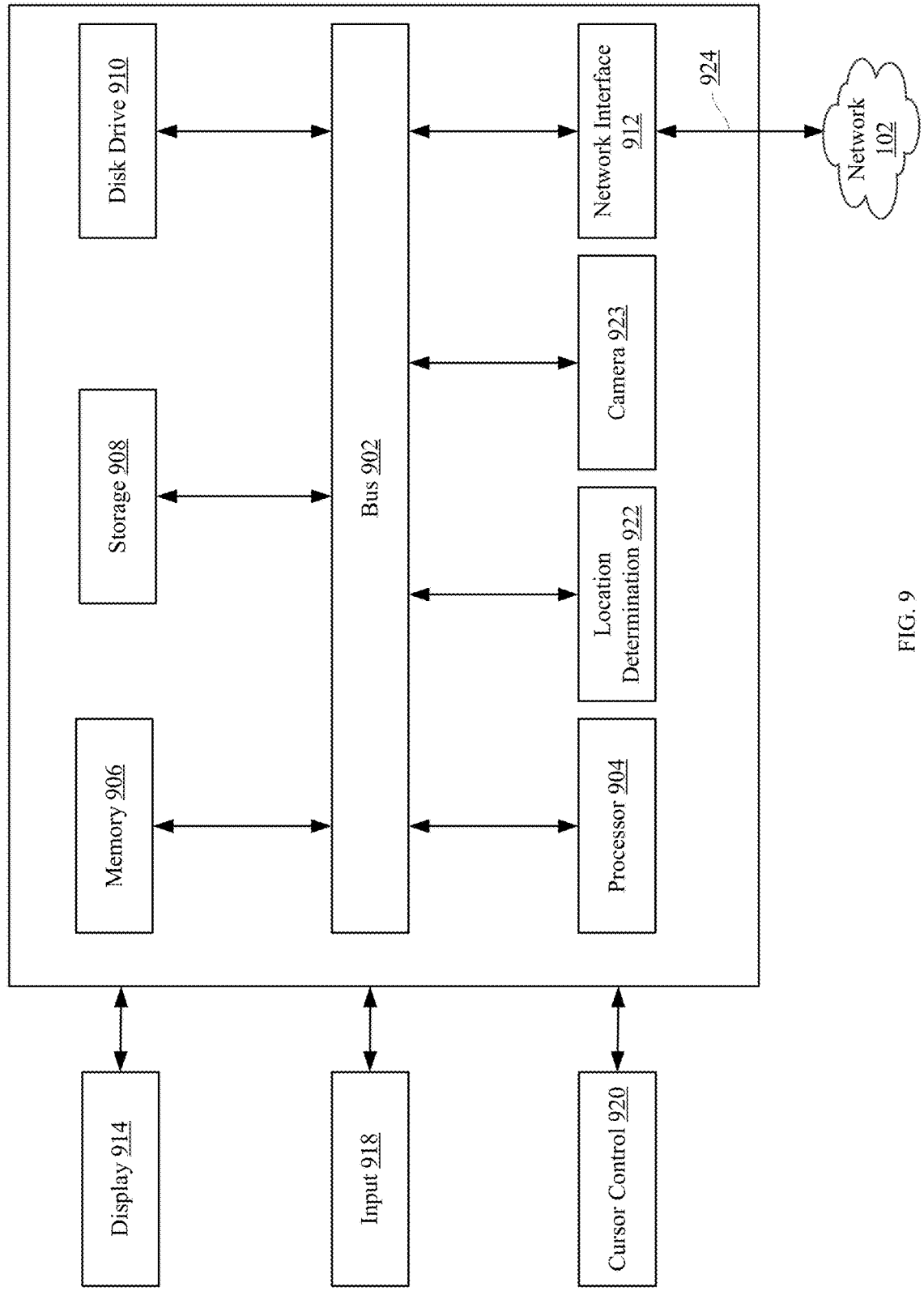
FIG. 9 is an embodiment of a computer system suitable for implementing, the systems and methods described in FIGS. 1-8.

Referring now to FIG. 9 an embodiment of a computer system 900 suitable for implementing, the systems and methods described in FIGS. 1-8 is illustrated.

In accordance with various embodiments of the disclosure, computer system 900, such as a computer and/or a server, includes a bus 902 or other communication mechanism for communicating information, which interconnects subsystems and components, such as a processing component 904 (e.g., processor, micro-controller, digital signal processor (DSP), graphics processing unit (GPU), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), a location determination component 922 (e.g., a Global Positioning System (GPS) device as illustrated, a cell tower triangulation device, and/or a variety of other location determination devices known in the art), and/or a camera component 923. In one implementation, the disk drive component 910 may comprise a database having one or more disk drive components.

In accordance with embodiments of the disclosure, the computer system 900 performs specific operations by the processing component 904 executing one or more sequences of instructions contained in the memory component 906, such as described herein with respect to the mobile communications devices, mobile devices, and/or servers. Such instructions may be read into the system memory component 906 from another computer readable medium, such as the static storage component 908 or the disk drive component 910. In other embodiments, hard-wired circuitry may be used in place of or in combination with software instructions to implement the disclosure.

Logic may be encoded in a computer readable medium, which may refer to any medium that participates in providing instructions to the processing component 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the disclosure, execution of instruction sequences to practice the disclosure may be performed by the computer system 900. In various other embodiments of the disclosure, a plurality of the computer systems 900 coupled by a communication link 924 to the network (e.g., such as a LAN, WLAN, PTSN, and/or various other wired or wireless networks, including telecommunications, mobile, and cellular phone networks) may perform instruction sequences to practice the disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Where applicable, various embodiments provided by the disclosure may be implemented using hardware, software, or combinations of hardware and software. Also, where applicable, the various hardware components and/or software components set forth herein may be combined into composite components comprising software, hardware, and/or both without departing from the scope of the disclosure. Where applicable, the various hardware components and/or software components set forth herein may be separated into sub-components comprising software, hardware, or both without departing from the scope of the disclosure. In addition, where applicable, it is contemplated that software components may be implemented as hardware components and vice-versa.

Software, in accordance with the disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the disclosure to the precise forms or particular fields of use disclosed. As such, it is contemplated that various alternate embodiments and/or modifications to the disclosure, whether explicitly described or implied herein, are possible in light of the disclosure. Having thus described embodiments of the disclosure, persons of ordinary skill in the art will recognize that changes may be made in form and detail without departing from the scope of the disclosure. Thus, the disclosure is limited only by the claims.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system comprising:
   a memory configured to store a data integration service; and
   a processor coupled to the memory and configured to cause the data integration service to perform operations, the operations comprising:
      uploading, using a user interface, a custom dataset in a user-specified format to the data integration service, wherein the data integration service is configured to integrate data in the custom dataset with data in a platform in another format;
      creating a dataset definition for the custom dataset, wherein the dataset definition includes a custom dataset name of the custom dataset, and the dataset definition is in a token-value format;
      creating a schema definition associated with the custom dataset, wherein the schema definition defines access to a subset of attributes in the custom dataset associated with the custom dataset name, wherein the access to the subset of attributes is in the token-value format;
      creating an entity definition associated with the custom dataset, wherein the entity definition defines at least one entity and links the subset of attributes and the custom dataset name to the at least one entity, and the at least one entity is in the token-value format;
      retrieving data associated with the subset of attributes from the custom dataset by applying the dataset definition, the schema definition, and the entity definition to the custom dataset; and
      uploading the retrieved data to the platform.

2. The system of claim 1, wherein the operations further comprise:
   storing the custom dataset in a container in a memory storage associated with the data integration service.

3. The system of claim 2, wherein the dataset definition further comprises a path to a location of the custom dataset in the memory storage.

4. The system of claim 3, wherein the path to the location includes at least a portion of the custom dataset name.

5. The system of claim 1, wherein the schema definition includes names of attributes in the subset of attributes that are associated with at least one entity in the entity definition.

6. The system of claim 1, wherein the schema definition includes descriptions of the subset of attributes displayed in the user interface.

7. The system of claim 1, wherein the entity definition includes entity data associated with the at least one entity and attribute data including values for the subset of attributes associated with the at least one entity.

8. The system of claim 1, wherein retrieving the data from the custom dataset further comprises:
   receiving the custom dataset name of the custom dataset;
   retrieving the dataset definition, the schema definition, and the entity definition using the custom dataset name;
   retrieving the custom dataset from a location included in the dataset definition; and
   retrieving the data from the custom dataset based on the schema definition and the entity definition.

9. The system of claim 8, wherein the operations further comprise:
    generating a table in the user interface based on the schema definition, wherein the table includes columns associated with the subset of attributes; and
    populating, based on the entity definition, the table with the data from the custom dataset in the columns that are associated with subset of attributes.

10. The system of claim 9, wherein the operations further comprise:
    populating an entity column in the table with the at least one entity included in the entity definition, wherein the data corresponds to the at least one entity.

11. The system of claim 10, wherein the operations further comprise:
    integrating the data from the custom dataset with the data associated with the platform; and
    displaying the integrated data in the table in the user interface.

12. A method, comprising:
    creating a dataset definition for a custom dataset, wherein the dataset definition includes a custom dataset name and a location of the custom dataset in a memory storage, wherein the dataset definition is in a token-value format and the custom dataset includes data;
    creating a schema definition associated with the custom dataset, wherein the schema definition defines access to a subset of attributes in the custom dataset associated with the custom dataset name, and includes a description of the subset of attributes, and wherein the subset of attributes is in the token-value format;
    creating an entity definition associated with the custom dataset, wherein the entity definition defines at least one entity and links the subset of attributes and the custom dataset name to the at least one entity, wherein the at least one entity is in the token-value format, and wherein the at least one entity comprises the custom dataset name, a data parameter that includes names of the subset of attributes and data from the custom dataset; and
    integrating the data from the custom dataset with data in platform in other formats using the dataset definition, the schema definition, and the entity definition.

13. The method of claim 12, wherein the entity definition includes data associated with the at least one entity and data associated with the description of the subset of attributes linked to the at least one entity.

14. The method of claim 12, further comprising:
    displaying, on a user interface, the data from the custom dataset based on the schema definition and the entity definition.

15. The method of claim 12, further comprising:
    generating a table in a user interface based on the schema definition, wherein the table includes columns associated with the subset of attributes and the columns include the description of the subset of attributes.

16. The method of claim 15, further comprising:
    populating the table with the data from the custom dataset in the columns that are associated with the subset of attributes.

17. The method of claim 15, further comprising:
    generating an entity column in the table based on the at least one entity included in the entity definition; and
    populating the entity column in the table with entity name associated with the at least one entity included in the entity definition.

18. A non-transitory machine-readable medium having instructions stored thereon, that when executed by a computing device cause the computing device to perform operations, the operations comprising:
    receiving, at a data integration service, a dataset name of a custom dataset, wherein the custom dataset includes data created by a user in a format different from other formats stored in a platform;
    retrieving a dataset definition, a schema definition, and an entity definition using the dataset name,
    wherein the dataset definition includes the dataset name, wherein the dataset definition is in a token-value format,
    wherein the schema definition defines access to a subset of attributes in the custom dataset associated with the dataset name and the access to the subset of attributes is in the token-value format, and
    wherein the entity definition defines at least one entity and links the subset of attributes and the dataset name to the at least one entity, and the at least one entity is in the token-value format;
    retrieving the custom dataset from a location included in the dataset definition;
    generating, using the schema definition, a table in a user interface coupled to the data integration service, the table including at least one attribute column heading for at least one column associated with at least one attribute defined in the subset of attributes in the schema definition and at least one entity column heading for at least one column associated with the at least one entity defined in the entity definition;
    populating the at least one column associated with the at least one attribute column heading in the table with data from the custom dataset based on the at least one entity defined in the entity definition and the at least one attribute defined in the schema definition; and
    populating the at least one column associated with the at least one entity column heading in the table with data from the entity definition.

19. The non-transitory machine-readable medium of claim 18, wherein the operations further comprise:
    populating the table with data stored in the platform in the other formats.

20. The non-transitory machine-readable medium of claim 18, wherein an attribute in the subset of attributes in the schema definition further comprises an attribute name included in the at least one entity in the entity definition and an attribute description displayed in the least one attribute column heading.

* * * * *